(12) United States Patent
Tamai et al.

(10) Patent No.: US 6,812,279 B2
(45) Date of Patent: Nov. 2, 2004

(54) METHOD FOR PRODUCING (METH) ACRYLIC ACID ESTER POLYMER

(75) Inventors: Hitoshi Tamai, Takasago (JP); Jun Kotani, Settsu (JP); Ayako Yano, Kakogawa (JP); Yuka Kanamori, Kobe (JP)

(73) Assignee: Kaneka Corporation, Osaka (JP)

( * ) Notice: Subject to any disclaimer, the term of this patent is extended or adjusted under 35 U.S.C. 154(b) by 99 days.

(21) Appl. No.: 10/196,419

(22) Filed: Jul. 17, 2002

(65) Prior Publication Data

US 2003/0027974 A1 Feb. 6, 2003

(30) Foreign Application Priority Data

Jul. 17, 2001 (JP) ......................................... 2001-216806
May 14, 2002 (JP) ......................................... 2002-139033

(51) Int. Cl.$^7$ ............................................. C08L 73/00
(52) U.S. Cl. .................... 524/506; 524/502; 525/100; 525/404
(58) Field of Search ................. 524/500, 502, 524/506; 525/100, 404

(56) References Cited

U.S. PATENT DOCUMENTS

| | | | |
|---|---|---|---|
| 4,543,403 A | | 9/1985 | Isayama et al. |
| 4,593,068 A | * | 6/1986 | Hirose et al. ............... 525/100 |
| 4,618,653 A | | 10/1986 | Kawakubo et al. |
| 4,618,656 A | | 10/1986 | Kawakubo et al. |
| 4,687,818 A | | 8/1987 | Kawakubo et al. |
| 5,109,064 A | * | 4/1992 | Wakabayashi et al. ...... 525/100 |

FOREIGN PATENT DOCUMENTS

| | | |
|---|---|---|
| EP | 0 594 938 A2 | 5/1994 |
| JP | 59-78223 | 5/1984 |
| JP | 59-168014 | 9/1984 |
| JP | 60-31556 | 2/1985 |
| JP | 60-228516 | 11/1985 |
| JP | 60-228517 | 11/1985 |
| JP | 63-112642 | 5/1988 |

OTHER PUBLICATIONS

Patent Abstracts of Japan, vol. 1999, No. 05, May 31, 1999 & JP 11 043512 A (Kanegafuchi Chem Ind Co Ltd), Feb. 16, 1999 *abstract*.

Patent Abstracts of Japan, vol. 012, No. 398 (C–538), Oct. 21, 1988 & JP 63 139957 A (Showa Highpolymer Co Ltd), Jun. 11, 1988 *abstract*.

Patent Abstracts of Japan, vol. 018, No. 575 (C–1268), Nov. 4, 1994 & JP 06 211922 A (Nippon Shokubai Co Ltd), Aug. 2, 1994 *abstract*.

* cited by examiner

*Primary Examiner*—Fred Teskin
(74) *Attorney, Agent, or Firm*—Sughrue Mion, PLLC

(57) ABSTRACT

There is provided a (meth)acrylic ester polymer having a silicon-containing functional group capable of crosslinking through formation of a siloxane bond, or a composition comprising the polymer, which does not contain any environment-hostile aromatic compound derived from a solvent, and of which TVOC (total volatile organic compound) emission is less than 1,500 $\mu g/m^3$. There is further provided a method for producing a polymer comprising a (meth)acrylic ester monomer unit as a molecular chain and having a silicon-containing functional group capable of crosslinking through formation of a siloxane bond, which comprises polymerizing a (meth)acrylic ester monomer using a solvent not containing any aromatic solvents as a polymerization solvent.

9 Claims, No Drawings

__

METHOD FOR PRODUCING (METH) ACRYLIC ACID ESTER POLYMER

TECHNICAL FIELD

The present invention relates to a method for producing a (meth)acrylic ester polymer not containing any aromatic compound derived from a solvent and to a composition comprising the polymer. More particularly, the invention relates to the above method for producing a copolymer of a (meth)acrylic ester monomer and a monomer having a silicon-containing functional group capable of crosslinking through formation of a siloxane bond. In the context of the invention, the (meth)acrylic ester means an ester of acrylic acid and/or an ester of methacrylic acid.

BACKGROUND ART

The polymer comprising a (meth)acrylic ester monomer unit as a molecular chain and having a silicon-containing functional group capable of crosslinking through formation of a siloxane bond (hereinafter referred to also as polymer (A)) is described in the official gazettes Japanese Kokai Publication Sho-59-078223, Japanese Kokai Publication Sho-59-168014, Japanese Kokai Publication Sho-60-031556, Japanese Kokai Publication Sho-60-228516, Japanese Kokai Publication Sho-60-228517, Japanese Kokai Publication Sho-63-112642, etc., and known to be of use in such applications as sealants and adhesives. The polymer is particularly useful for use in a composition comprising it in combination with an oxyalkylene polymer having a silicon-containing functional group capable of crosslinking through formation of a siloxane bond (hereinafter referred to also as oxyalkylene polymer (B)).

In the production of said polymer (A), aromatic compounds such as toluene and xylene are generally used as polymerization solvents. This is because these are good solvents for the polymer and available at low cost. However, because of environmental needs for paying attention to the sick-house problem, alleviation of the environmental burden within clean-rooms for semiconductor production, etc., it is desirable to employ solvents in lieu of such aromatic compounds.

OBJECT OF THE INVENTION

The object of the present invention is to provide a method for producing a polymer (A) utilizing a solvent which, though not an aromatic compound, can be used for the production of said polymer (A) and a composition comprising the polymer (A) obtainable by said method.

SUMMARY OF THE INVENTION

The inventors of the present invention found that by using a certain nonaromatic solvent, namely one or more solvent species selected from the group consisting of alcohol solvents and carbonyl group-containing solvents, preferably one or more members selected from the group consisting of alcohols containing 3 or 4 carbon atoms and dialkyl carbonates, the polymerization reaction of interest can be allowed to proceed in the same way as it is the case with an aromatic solvent and that the resulting polymer does not separate out as a precipitate but remains dissolved in the solvent and further that because of the lower intensity of the so-called solvent odor, said nonaromatic solvent is quite suitable for the production of polymer (A). At the same time, the inventors further discovered that when a certain azo polymerization initiator is used in combination with said nonaromatic solvent in the production of polymer (A), the emission of VOC (Volatile Organic Compound) from the formulation or composition thereof as coated on a substrate can be more effectively suppressed. It was also found by the inventors that compared with the conventional polymer produced by using an aromatic solvent, the polymer (A) produced by the above method of the invention features a narrower molecular weight distribution (Mw/Mn), an improved compatibility with said oxyalkylene polymer (B) to be blended therewith, and an improved weatherability. The inventors further found that because the molecular weight distribution can be narrowed, the viscosity of the composition can also be reduced without detracting from its dynamic properties and weatherability, with the result that the workability in coating with the composition can be improved. The present invention has accordingly been accomplished. The present invention, therefore, comprises the following inventions.

(1) A method for producing a polymer comprising a (meth)acrylic ester monomer unit as a molecular chain and having a silicon-containing functional group capable of crosslinking through formation of a siloxane bond, which comprises polymerizing a (meth)acrylic ester monomer using a solvent not containing any aromatic solvents as a polymerization solvent.

(2) The method according to the above paragraph (1), wherein the polymerization solvent is one or more members selected from the group consisting of alcohol solvents and carbonyl group-containing solvents.

(3) The method according to any of the above paragraphs (1) and (2), wherein the polymerization solvent is one or more members selected from the group consisting of aliphatic alcohols containing 3 or 4 carbon atoms and dialkyl carbonates.

(4) The method according to any of the above paragraphs (1) to (3), wherein the (meth)acrylic ester monomer is a mixture of (1) an alkyl (meth)acrylate monomer containing an alkyl group of 1 to 8 carbon atoms and (2) an alkyl (meth)acrylate monomer containing an alkyl group containing 10 or more carbon atoms.

(5) A method for producing a polymer comprising a (meth)acrylic ester monomer unit as a molecular chain and having a silicon-containing functional group capable of crosslinking through formation of a siloxane bond, which comprises polymerizing (meth)acrylic ester monomer using a polymerization solvent of one or more members selected from the group consisting containing aliphatic alcohols containing 3 or 4 carbon atoms and dialkyl carbonates but not containing an aromatic compound in a concentration over 1,000 ppm based on the said polymer.

(6) The method according to any of the above paragraphs (1) to (5), wherein the polymerization solvent is 2-propyl alcohol.

(7) The method according to any of the above paragraphs (1) to (5), wherein the polymerization solvent is dimethyl carbonate.

(8) The method according to any of the above paragraphs (1) to (7), wherein 2,2'-azobis(dimethylvaleronitrile) is used as a polymerization initiator.

(9) A polymer composition comprising a reactive composition (C) comprising a polymer (A) comprising a (meth)acrylic ester monomer unit as a molecular chain and having a silicon-containing functional group capable of crosslinking through formation of a siloxane bond and an oxyalkylene polymer (B) having a silicon-containing functional group capable of crosslinking through formation of a siloxane bond and a nonaromatic solvent component, with the aromatic solvent content of the polymer composition being not more than 1,000 ppm based on the whole reactive component (C) and said polymer (A) being obtainable by the method according to any of the above paragraphs (1) to (8).

(10) The composition according to the above paragraph (9)

wherein the total emission of organic compounds from said reactive composition (C) into the air is less than 1,500 μg/m³ as measured by the method described in the Feb. 14, 2001 edition of GEV Specification and Classification Criteria established by GEV: Gemeinschaft Emissionskontrollierte Verlegewerkstoffe e.V.

(11) The composition according to the above paragraph (9)

wherein the total emission of organic compounds from said component (C) into the air is less than 500 μg/M³ as measured by the method described in the February 14, 2001 edition of GEV Specification and Classification Criteria established by GEV: Gemeinschaft Emissionskontrollierte Verlegewerkstoffe e.V.

(12) The composition according to any of the above paragraphs (9) to (11), wherein the oxyalkylene polymer as a starting material for the oxyalkylene polymer (B) having a silicon-containing functional group capable of crosslinking through formation of a siloxane bond is an oxyalkylene polymer produced by at least one method selected from the group consisting of the anionic polymerization method using a caustic alkali, the chain-extending reaction method starting with an oxyalkylene polymer, the polymerization method using a double metal cyanide complex as a catalyst, the polymerization method using cesium metal as a catalyst, and the polymerization method using a polyphosphazene salt as a catalyst.

(13) The composition according to any of the above paragraphs (9) to (12), wherein the silicon-containing functional group capable of crosslinking through formation of a siloxane bond in each of said polymer (A) and polymer (B) is at least one member selected from the group consisting of dimethylmonomethoxysilyl, methyldimethoxysilyl, trimethoxysilyl, methyldiethoxysilyl, triethoxysilyl, methyldiisopropenyloxysilyl, and triisopropenyloxysilyl group.

(14) The composition according to any of the above paragraphs (9) to (13), wherein the oxyalkylene polymer as a starting material for the oxyalkylene polymer (B) having a silicon-containing functional group capable of crosslinking through formation of a siloxane bond is a polymer produced by the polymerization method using a double metal cyanide complex as a catalyst and having a number average molecular weight, Mn, of not less than 6,000 and a molecular weight distribution, Mw/Mn, of not more than 1.6.

(15) The composition according to any of the above paragraphs (9) to (14), wherein the total emission of organic compounds into the air from the cured artifact obtainable by allowing the reactive composition (C) to cure at atmospheric temperature for 10 days and further at 50° C. for 14 days is less than 100 μg/m³.

(16) The composition according to any of the above paragraphs (9) to (15), wherein the reactive component (C) substantially does not contain any of toluene, xylene, styrene, ethylbenzene, p-dichlorobenzene, di-2-ethylhexyl phthalate, di-n-butyl phthalate, and formaldehyde.

(17) The composition according to any of the above paragraphs (9) to (15), wherein the reactive component (C) is such that the total emission of organic compounds therefrom into the air as measured by the method described in the Feb. 14, 2001 edition of GEV Specification and Classification Criteria established by GEV: Gemeinschaft Emissionskontrollierte Verlegewerkstoffe e.V.

is less than 1 μg/m³ for any of toluene, xylene, styrene, ethylbenzene, p-dichlorobenzene, di-2-ethylhexyl phthalate, and di-n-butyl phthalate and less than 5 μg/m³ for formaldehyde.

BEST MODE FOR CARRYING OUT THE INVENTION

The (meth)acrylic ester monomer for use in the invention is preferably the monomer which can be represented by the following general formula (1):

$$CH_2=C(R^1)COOR^2 \qquad (1)$$

(wherein $R^1$ represents a hydrogen atom or a methyl group; $R^2$ represents a substituted or unsubstituted univalent hydrocarbon group).

For $R^2$ in the above general formula (1), there can be mentioned, among others; alkyl groups containing 1 to 8 carbon atoms such as methyl, ethyl, propyl, n-butyl, t-butyl and 2-ethylhexyl; alkyl groups containing 10 or more carbon atoms such as lauryl, tridecyl, cetyl, stearyl, $C_{22}$-alkyl and behenyl; and substituted hydrocarbon groups such as glycidyl, aminoethyl and diethylaminoethyl.

As compounds of general formula (1), (meth)acrylic ester monomers having the above-mentioned groups can be mentioned. These may be used each independently or as a mixture of two or more species. Preferred, among these, are (meth)acrylic ester monomers having methyl or n-butyl for $R^2$. The polymer (A) may contain units derived from other monomers than such (meth)acrylic ester monomers. However, the proportion of the unit or units derived from (meth)acrylic ester monomer(s) in the polymer (A) should be at least 50 weight %, preferably not less than 70 weight %.

As such monomers other than (meth)acrylic ester monomers, there can be mentioned, among others, monomers having a carboxyl group such as acrylic acid and methacrylic acid; monomers having an amide group such as acrylamide, methacrylamide, N-methylolacrylamide and N-methylolmethacrylamide; monomers having an epoxy group such as glycidyl acrylate and glycidyl methacrylate; monomers having an amino group such as diethylaminoethyl acrylate, diethylaminoethyl methacrylate and aminoethyl vinyl ether; and other monomers such as acrylonitrile, iminol methacrylate, styrene, α-methylstyrene, alkyl vinyl ethers, vinyl chloride, vinyl acetate, vinyl propionate and ethylene.

As described hereinafter, in using the polymer (A) and oxyalkylene polymer (B) in combination, it is preferable to carry out the polymerization using a mixture of a monomer represented by the following general formula (2) and a monomer represented by the following general formula (3) as the (meth)acrylic ester monomer;

$$CH_2=C(R^1)COOR^3 \tag{2}$$

(wherein $R^1$ represents a hydrogen atom or a methyl group; $R^3$ represents an alkyl group containing 1 to 8 carbon atoms);

$$CH_2=C(R^1)COOR^4 \tag{3}$$

(wherein $R^1$ represents a hydrogen atom or a methyl group; $R^4$ represents an alkyl group containing 10 or more carbon atoms).

$R^3$ is preferably an alkyl group of 1 to 4 carbon atoms, more preferably an alkyl group of 1 or 2 carbon atoms. Specific examples are as mentioned above. $R^4$ is preferably a long-chain alkyl group containing 10 to 30 carbon atoms, more preferably a long-chain alkyl group of 10 to 20 carbon atoms. Specific examples are also as mentioned above. It is preferable that the combined total amount of the monomer unit derived from the monomer represented by the above general formula (2) and the monomer unit derived from the monomer represented by the above general formula (3) in the polymer (A) should be at least 50 weight %, more preferably not less than 70 weight %. The ratio of existence of the monomer unit corresponding to the general formula (2) to the monomer unit corresponding to the general formula (3) is preferably 95:5 to 40:60 by weight, more preferably 90:10 to 60:40 by weight.

As the monomers other than the monomer of general formula (2) and the monomer of general formula (3), there can be mentioned among others monomers having a carboxylic group such as acrylic acid and methacrylic acid; monomers having an amide group such as acrylamide, methacrylamide, N-methylolacrylamide and N-methylolmethacrylamide; monomers having an epoxy group such as glycidyl acrylate and glycidyl methacrylate; monomers containing an amino group such as diethylaminoethyl acrylate, diethylaminoethyl methacrylate and aminoethyl vinyl ether; and other monomers such as acrylonitrile, iminol methacrylate, styrene, α-methylstyrene, alkyl vinyl ethers, vinyl chloride, vinyl acetate, vinyl propionate and ethylene.

Referring to the polymer (A), a polymer having a number average molecular weight between 500 and 100,000 is preferred in terms of the ease of handling.

The silicon-containing functional group capable of crosslinking through formation of a siloxane bond (hereinafter referred to sometimes as reactive silicone functional group) for use in the present invention is a well-known functional group being capable of crosslinking even at room temperature. A typical example of the reactive silicone functional group can be represented by the following general formula (4):

$$-(-Si(R^5{}_a)X_{2-a}-O-)_m-Si(R^5{}_b)X_{3-b} \tag{4}$$

(wherein $R^5$ represents a substituted or unsubstituted univalent organic group containing 1 to 20 carbon atoms or a triorganosiloxy group; X represents a hydroxyl group or a hydrolyzable group which may be the same or different in a plurality of occurrences; a represents an integer of 0, 1 or 2; b represents an integer of 0, 1, 2 or 3, excluding the case in which a=2 and simultaneously b=3; m represents an integer of 0 to 18). The reactive silicone functional group preferred chiefly from economic points of view is represented by the following general formula (5):

$$-Si(R^5{}_n)X_{3-n} \tag{5}$$

(wherein $R^5$ and X are as defined above; n represents an integer of 0, 1 or 2).

To provide for sufficient curability, the number of reactive silicone functional groups in the polymer (A) is preferably not less than 1 on the average, more preferably not less than 1.1, still more preferably not less than 1.5, and these groups are preferably present so that the apparent number average molecular weight per reactive silicone functional group will be 300 to 4,000.

The hydrolyzable group defined in the general formulas (4) and (5) includes, but is not limited to, halogen and hydrogen atom, alkoxy, acyloxy, ketoximate, amino, amido, aminoxy, mercapto and alkenyloxy group. From the standpoint of mildness of hydrolyzability, alkoxy groups such as methoxy and ethoxy are preferred among them.

Referring, further, to the general formulas (4) and (5), $R^5$ includes, but is not limited to, alkyl groups, e.g. methyl and ethyl; cycloalkyl groups, e.g. cyclohexyl; aryl groups, e.g. phenyl; and aralkyl groups, e.g. benzyl. $R^5$ may optionally be a triorganosiloxy group represented by the following general formula:

$$(R^5)_3SiO-$$

($R^5$ is as defined above). Among various species thereof, trimethylsiloxy is particularly preferred.

Many different methods are available for introducing reactive silicone functional groups into the polymer (A). For example, there can be mentioned (a) the method which comprises adding a compound having both a polymerizable unsaturated bond and a reactive silicone functional group (e.g. $CH_2=CHSi(OCH_3)_3$) to a monomer of the general formula (1) and carrying out a copolymerization reaction and (b) the method which comprises adding a compound having both a polymerizable unsaturated bond and a reactive functional group (hereinafter referred to as the Y group) (e.g. acrylic acid) to a monomer of the general formula (1), carrying out a copolymerization reaction, and reacting the resulting copolymer further with a compound having both a reactive silicone functional group and a functional group reactive with the Y group (hereinafter referred to as the Y' group) (e.g. a compound having an isocyanato group and a $-Si(OCH_3)_3$ group), among other methods.

The above-mentioned compound having both a polymerizable unsaturated bond and a reactive silicone functional group includes the compound having the following general formula (6):

$$R^6-(-Si(R^5{}_a)X_{2-a}-O-)_m-Si(R^5{}_b)X_{3-b} \tag{6}$$

(wherein $R^6$ represents an organic residue having a polymerizable unsaturated bond; $R^5$, X, a, b, and m are as defined above). Among species of the compound represented by the above general formula (6), the preferred is the compound which can be represented by the general formula (7):

$$CH_2=C(R^1)-Q-Si(CH_3)_nX_{3-n} \tag{7}$$

(wherein $R^1$, X and n are as defined above; Q represents a divalent organic group such as $-COOR^7-$ ($R^7$ represents a divalent alkylene group containing 1 to 6 carbon atoms, e.g. —CH$_2$— or —CH$_2$CH$_2$—), —CH$_2$C$_6$H$_4$CH$_2$CH$_2$— or —CH$_2$OCOC$_6$H$_4$COO(CH$_2$)$_3$—, or a direct bond).

The compound represented by the above general formula (6) or general formula (7) includes, but is not limited to, the following compounds; CH$_2$=CHSi(CH$_3$)(OCH$_3$)$_2$, CH$_2$=CHSi(CH$_3$)Cl$_2$, CH$_2$=CHSi(OCH$_3$)$_3$, CH$_2$=CHSiCl$_3$, CH$_2$=CHCOO(CH$_2$)$_2$Si (CH$_3$) (OCH$_3$)$_2$, CH$_2$=CHCOO(CH$_2$)$_2$Si(OCH$_3$)$_3$, CH$_2$=CHCOO(CH$_2$)$_2$Si(CH$_3$)$_2$Cl$_2$, CH$_2$=CHCOO(CH$_2$)$_2$SiCl$_3$, CH$_2$=C(CH$_3$)COO (CH$_2$)$_2$Si(CH$_3$)(OCH$_3$)$_2$, CH$_2$=C(CH$_3$)COO(CH$_2$)$_2$Si (OCH$_3$)$_3$, CH$_2$=C(CH$_3$)COO(CH$_2$)$_3$Si(CH$_3$)(OCH$_3$)$_2$, CH$_2$=C(CH$_3$)COO(CH$_2$)$_3$Si(OCH$_3$)$_3$, CH$_2$=C(CH$_3$)COO (CH$_2$)$_2$Si(CH$_3$)Cl$_2$, CH$_2$=C(CH$_3$)COO(CH$_2$)$_2$SiCl$_3$, CH$_2$=CHCH$_2$OC(O)—C$_6$H$_4$— COO(CH$_2$)$_3$Si(CH$_3$) (OCH$_3$)$_2$, CH$_2$=CHCH$_2$OC(O)—C$_6$H$_4$— COO(CH$_2$)$_3$Si (OCH$_3$)$_3$, CH$_2$=CHCH$_2$OC(O)—C$_6$H$_4$—COO(CH$_2$)$_3$Si (CH$_3$)Cl$_2$, CH$_2$=CHCH$_2$OC(O)—C$_6$H$_4$—COO(CH$_2$)$_3$ SiCl$_3$, etc.

While these silane compounds can be synthesized by various methods, a typical method comprises reacting acetylene, allyl acrylate, allyl methacrylate, diallyl phthalate or the like with methyldimethoxysilane, methyldichlorosilane or the like in the presence of a Group VIII transition metal catalyst. As the transition metal complex catalysts, complex compounds of a Group VIII transition metal selected from the group consisting of platinum, rhodium, cobalt, palladium and nickel can be used with advantage. Platinum compounds such as platinum black, chloroplatinic acid, platinum alcohol compounds, platinum olefin complexes, platinum aldehyde complexes and platinum ketone complexes are particularly preferred.

The method (b) mentioned above is now described in detail, citing a specific example. Referring to the above-mentioned method (b), while species of said Y group and Y' group can be used in various combinations, there may be mentioned the combination of a vinyl group for the Y group and a hydrosilyl (H—Si) group for the Y' group as an example. These specific groups Y and Y' can undergo hydrosilylation reaction and be united. The compound having both a vinyl group as the Y group and a polymerizable unsaturated bond includes, but is not limited to, allyl acrylate, allyl methacrylate, diallyl phthalate, neopentyl glycol diacrylate, neopentyl glycol dimethacrylate, 1,5-pentanediol diacrylate, 1,5-pentanediol dimethacrylate, 1,6-hexanediol diacrylate, 1,6-hexanediol dimethacrylate, polyethylene glycol diacrylate, polyethylene glycol dimethacrylate, polypropylene glycol diacrylate, polypropylene glycol dimethacrylate, divinylbenzene and butadiene.

On the other hand, as a representative example of the compound having both a hydrosilyl group as the Y' group and a reactive silicone functional group, the hydrosilane compound of the following general formula (8) can be mentioned;

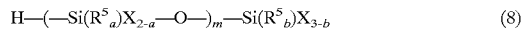   (8)

(wherein R$^5$, x, a, b and m are as defined above).

The hydrosilane compound of the general formula (8) includes, but is not limited to, halogenated silanes such as trichlorosilane, methyldichlorosilane, dimethylchlorosilane and trimethylsiloxydichlorosilane; alkoxysilanes such as trimethoxysilane, triethoxysilane, methyldimethoxysilane, phenyldimethoxysilane and 1,3,3,5,5,7,7-heptamethyl-1,1-dimethoxytetrasiloxane; acyloxysilanes such as methyldiacetoxysilane and trimethylsiloxymethylacetoxysilane; ketoximatosilanes such as bis(dimethylketoximato) methylsilane, bis(cyclohexylketoximato)methylsilane and bis(diethylketoximato)trimethylsiloxysilane; hydrosilanes such as dimethylsilane, trimethylsiloxymethylsilane and 1,1-dimethyl-2,2-dimethyldisiloxane; and alkenyloxysilanes such as methyltri(isopropenyloxy)silane.

The hydrosilane compound to be reacted with the C=C bond may be used in any desired relative amount but it is preferable to use 0.5 to 2 molar equivalents relative to the C=C bond. Use of the hydrosilane compound over the above range is not objectionable but the excess will be simply recovered as unreacted hydrosilane.

The reaction between the hydrosilane compound and the C=C bond requires said Group VIII transition metal catalyst. This hydrosilylation reaction can be conducted at any suitable temperature between 50° C. and 130° C., and the reaction time is about 1 to 10 hours.

The polymer (A) according to the invention can be produced by the vinyl polymerization, e.g. vinyl radical polymerization, of the monomer represented by the general formula (1), using the conventional solution polymerization technique.

This polymerization reaction is carried out in the presence of a radical polymerization initiator at a temperature of 50 to 150° C., optionally with the addition, for obtaining the preferred polymer (A) having a number average molecular weight of 500 to 100,000, of a chain transfer agent such as n-dodecylmercaptan or t-dodecylmercaptan. In the present invention, it is preferable to use a polymerization solvent such that the concentrations of aromatic compounds such as toluene, xylene, styrene, ethylbenzene, p-dichlorobenzene, di-2-ethylhexyl phthalate and di-n-butyl phthalate are invariably less than 1 μg/m$^3$ and the concentration of formaldehyde is less than 5 μg/m$^3$. It is more preferable to use a polymerization solvent which does not contain any of toluene, xylene, styrene, ethylbenzene, p-dichlorobenzene, di-2-ethylhexyl phthalate, di-n-butyl phthalate and formaldehyde.

As the solvent not containing aromatic compounds, there can be used various inert solvents, e.g. hydrocarbon solvents such as hexane, heptane, octane, cyclohexane and methylcyclohexane; ester solvents such as butyl acetate, n-propyl acetate and isopropyl acetate; ketone solvents such as methyl isobutyl ketone and methyl ethyl ketone; dialkyl carbonates such as dimethyl carbonate and diethyl carbonate; and alcohol solvents such as propyl alcohol, butyl alcohol and amyl alcohol. Among these, one or more members selected from the group consisting of dialkyl carbonate solvents and alcohol solvents are preferably used in view of the fact that these are not the substrates designated in the Ministry of Health, Labour and Welfare control target value programs well as from odor and eco-friendliness points of view. Furthermore, in terms of boiling point as well as suppression of emission of total volatile organic compound (hereinafter abbreviated as TVOC) from the composition in the GEV test, dimethyl carbonate, propyl alcohol and butyl alcohol are preferred. As to said propyl alcohol, n-propyl alcohol and 2-propyl alcohol, and as to said butyl alcohol, n-butyl alcohol, 2-butyl alcohol, isobutyl alcohol and tert-butyl alcohol can be used each independently or as a mixture of two or more species. Among these, 2-propyl alcohol and isobutyl alcohol are particularly preferred because each of these solvents has a hydrogen atom attached to the tertiary carbon atom and, as such, functions as if it were a chain transfer agent, thus helping to reduce the requirements of the chain transfer agent. Although each of 2-propyl alcohol and isobutyl alcohol is preferably used alone, it may be used in combination with a small proportion of other solvents.

After completion of the reaction, the solvent is preferably removed, for example by evaporation. When an aromatic compound is used concomitantly as said hydrocarbon solvent, the concentration of the residual aromatic compound in the polymer (A) is preferably not more than 1,000 ppm. When the concentration is not more than 1,000 ppm, the amount of the aromatic compound emanating from the polymer composition and the cured artifact will be so small that the influence on the human body and environment will be negligible.

The TVOC measuring conditions used for the GEV test were as follows. The (C) component mentioned above or the composition containing the (C) component was coated on a glass plate in a coating weight of 300 g/m$^2$. Using a chamber (made of stainless steel) having a capacity such that a free space of 1 m$^3$ would be provided for 0.4 m$^2$ of the coated glass panel, the coated panel was incubated at 23° C.×50% R.H. The air in a volume equal to ½ of the chamber capacity was changed every hour, and the air in the chamber on day 10 was trapped in an absorption tube (standard absorption tube; Tenax TA) and, after desorption, assayed for VOC by gas chromatography. The amount of TVOC as determined by the GEV test is preferably less than 1,500 μg/m$^3$, more preferably less than 500 μg/m$^3$.

After 10 days of incubation at 23° C.×50% R.H. according to the above GEV test protocol, the specimen was further incubated at 50° C.×14 days. Then, the air in the chamber was similarly trapped in an absorption tube and measured for VOC by gas chromatography. The emission of TVOC from the cured artifact is preferably less than 100 μg/m$^3$ as determined by the trapping and measuring procedures of the GEV test.

By using said nonaromatic solvent as the polymerization solvent, the molecular weight distribution (Mw/Mn) of the product polymer (A) can be made narrower than that obtainable by using an aromatic solvent. The molecular weight distribution (Mw/Mn) is about 1.8 to 3.0, preferably 1.7 to 2.5, more preferably 1.5 to 2.3.

Because the molecular weight distribution (Mw/Mn) of the polymer (A) can be narrowed, there can be obtained a polymer (A) species comparatively lean in branching so that the compatibility with the oxyalkylene polymer (B) to be blended is improved. As a result, the polymer (A) can be microscopically more uniformly dispersed in the whole composition so that the weatherability of the cured artifact is improved. Moreover, as the polymer (A) can be more uniformly blended with the polymer (B), the viscosity of the resulting composition can be held low without detracting from its dynamic properties and weatherability. As a result, workability in coating with the composition can be improved.

In the production of polymer (A), there can be used a polymerization initiator such as a peroxide initiator, e.g. benzoyl peroxide, lauryl peroxide, cumyl peroxyneodecanoate or t-butyl peroxyneodecanoate, or an azo initiator, e.g. 2,2'-azobisisobutyronitrile, 2,2'-azobis(2-methylbutyronitrile), 2,2'-azobis(2,4-dimethylvaleronitrile), 1,1'-azobis(cyclohexane-1-carbonitrile), dimethyl 2,2'-azobis(2-methylpropionate). Among these, azo initiators are preferred in terms of the conditions of storage of the initiator itself and the molecular weight characteristics of the product polymer. In view of the TVOC emission level in the GEV test, 2,2'-azobis(dimethylvaleronitrile) is particularly preferred.

The oxyalkylene polymer having a reactive silicone functional group within the molecule (oxyalkylene polymer (B)) for use in the present invention has been disclosed in Japanese Kokoku Publication Sho-45-036319, Japanese Kokoku Publication Sho-46-012154 and Japanese Kokoku Publication Sho-49-032673; Japanese Kokai Publication Sho-50-156599, Japanese Kokai Publication Sho-51-073561, Japanese Kokai Publication Sho-54-006096, Japanese Kokai Publication Sho-55-082123, Japanese Kokai Publication Sho-55-123620, Japanese Kokai Publication Sho-55-125121, Japanese Kokai Publication Sho-55-131022, Japanese Kokai Publication Sho-55-135135, Japanese Kokai Publication Sho-55-137129 and Japanese Kokai Publication Hei-03-072527.

The molecular chain of the oxyalkylene polymer (B) is preferably composed essentially of a repeating unit of the general formula: —$R^8$—O— (wherein $R^8$ represents a divalent organic group and most preferably is a hydrocarbon group of 3 or 4 carbon atoms in a large majority of occurrences). As specific examples of $R^8$, there can be mentioned —$CH_2CH_2$—, —$CH(CH_3)CH_2$—, —$CH(C_2H_5)CH_2$—, —$C(CH_3)_2CH_2$—, —$CH_2CH_2CH_2$— and —$CH_2CH_2CH_2CH_2$—. The molecular chain of the said oxyalkylene polymer may be comprised of one kind of repeating unit or two or more kinds of repeating units, or even has a branched structure. The particularly preferred example of $R^8$ is —$CH(CH_3)CH_2$—.

The reactive silicone functional group of the oxyalkylene polymer (B) is the same as mentioned hereinbefore.

To form the molecular chain of an oxyalkylene polymer, a substituted or unsubstituted epoxy compound containing 2 to 12 carbon atoms such as an alkylene oxide compound, namely ethylene oxide, propylene oxide, α-butylene oxide, β-butylene oxide, hexene oxide, cyclohexene oxide, styrene oxide, α-methylstyrene oxide, or the like, or an alkyl, allyl or aryl glycidyl ether compound, namely, methyl glycidyl ether, ethyl glycidyl ether, isopropyl glycidyl ether, butyl glycidyl ether, allyl glycidyl ether, phenyl glycidyl ether, or the like, is subjected to a ring-opening polymerization using a dihydric or polyhydric alcohol, such as ethylene glycol, propylene glycol, butanediol, hexamethylene glycol, methallyl alcohol, hydrogenated bisphenol A, neopentyl glycol, polybutadienediol, diethylene glycol, triethylene glycol, polyethylene glycol, polypropylene glycol, polypropylene triol, polypropylene tetraol, dipropylene glycol, glycerol, trimethylolmethane, trimethylolpropane or pentaerythritol, or a hydroxyl group-containing oligomer as a polymerization initiator in the presence of a catalyst to prepare a polyether. The catalyst which can be used to catalyze this polymerization includes the known catalysts, for example alkaline catalysts such as KOH and NaOH, acidic catalysts such as trifluoroborane etherate, aluminoporphyrin-metal complexes and double metal cyanide complex catalysts such as cobalt zinc cyanide-glyme complex, phosphazene catalysts (PZN) which are nonmetallic molecular catalysts, and cesium catalysts. The double metal cyanide complex catalysts and the phosphazene catalysts (PZN), which are nonmetallic molecular catalysts, are particularly preferred because these cause a few side reactions and give polymers of low viscosity despite high molecular weights.

The molecular chain comprising a hydroxyl group-terminated oxyalkylene polymer includes the species described in Japanese Kokai Publication Sho-46-027250, Japanese Kokai Publication Sho-50-149797, Japanese Kokai Publication Sho-61-197631, Japanese Kokoku Publication Sho-59-015336, Japanese Kokai Publication Hei-02-276821, Japanese Kokai Publication Hei-10-273512, Japanese Kokai Publication Hei-11-106500, etc.

To provide for sufficient curability, the number of reactive silicone functional groups in the oxyalkylene polymer (B) is preferably not less than 1 on the average, more preferably not less than 1.1, still more preferably not less than 1.5.

Furthermore, from the viewpoint of curability and cured product's elongation, the reactive silicone functional group is preferably located at the molecular chain terminus of the oxyalkylene polymer (B).

In consideration of the ease of handling of the polymer composition and from the viewpoint of curability and cured product's elongation, the number average molecular weight of the oxyalkylene polymer (B) is preferably 500 to 50,000, more preferably 3,000 to 20,000. Furthermore, the molecular weight distribution (Mw/Mn) of the polymer (B) as determined by gel permeation chromatography (GPC) is preferably not more than 2.0. When the molecular weight distribution is not more than 2.0, the viscosity is low even if the number average molecular weight is large so that good workability is obtained. Various species of oxyalkylene polymer (B) may be used each independently or in a combination of two or more species. For still better workability, it is preferable to use a polymer (B) species which has been obtained by using a double metal cyanide complex catalyst and has a number average molecular weight (Mn) of not less than 6,000 and a molecular weight distribution (Mw/Mn) of not more than 1.6.

The oxyalkylene polymer (B) may for example be a polymer produced by carrying out an addition reaction between a hydrated silicon compound of general formula (8) and an olefin group-containing polyether of general formula (9):

$$CH_2=C(R^9)-R^{10}-(O)_c- \qquad (9)$$

(wherein $R^9$ represents a hydrogen atom or a univalent organic group containing 1 to 20 carbon atoms; $R^{10}$ represents a divalent organic group containing 1 to 20 carbon atoms; c represents an integer of 0 or 1) in the presence of a Group VIII transition metal catalyst such as said platinum compound.

As the method of producing oxyalkylene polymer (B) species other than the above-mentioned one, there are known (a) the method which comprises reacting a hydroxyl group-terminated oxyalkylene polymer with a polyisocyanate compound, such as toluene diisocyanate, to prepare an isocyanato group-terminated oxyalkylene polymer and causing this isocyanato group to react with the W group of a silicon compound represented by the general formula (10):

$$W-R^{10}-Si(R^5_n)X_{3-n} \qquad (10)$$

(wherein W represents an active hydrogen-containing group selected from the group consisting of a hydroxyl group, a carboxyl group, a mercapto group and an amino group (primary or secondary); n, $R^5$, $R^{10}$ and X are as defined above); (b) the method which comprises addition-reacting the mercapto group of a silicon compound of the general formula (10) wherein W is a mercapto group to the olefin group of an olefin group-containing oxyalkylene polymer of the general formula (9); and (c) the method which comprises causing a compound of the general formula (11):

$$OCN-R^{10}-Si(R^5_n)X_{3-n} \qquad (11)$$

(wherein $R^5$, $R^{10}$, X and n are as defined hereinbefore) to react with the hydroxyl group of a hydroxyl group-terminated oxyalkylene polymer. However, the present invention is by no means restricted to these specific methods.

The specific method of producing an olefin group-containing oxyalkylene polymer of general formula (9) includes, but is not limited to, the methods disclosed in Japanese Kokai Publication Sho-54-006097 and Japanese Kokai Publication Hei-03-072727 and the method in which, in the polymerization of an epoxy compound such as ethylene oxide or propylene oxide, an olefin group-containing epoxy compound such as allyl glycidyl ether is added and copolymerized to introduce the olefin group into the polymer side chain.

Regarding the relative amount of the polymer (A) with respect to the oxyalkylene polymer (B) in the composition of the present invention, the range of 5 to 5,000 weight parts of the polymer (A) relative to 100 weight parts of the oxyalkylene polymer (B) is preferred because the improving effect on the characteristics of the respective polymers (A) and (B) is remarkable within this range. The more preferred range is 5 to 2,000 weight parts of (A) and generally the optimal proportion is selected according to the intended use and expected performance.

The composition of the invention can be obtained by producing the polymer (A) and the oxyalkylene polymer (B) respectively and then blending them, but it is also possible to obtain the desired composition by polymerizing the (meth)acrylic ester monomer in the presence of the oxyalkylene polymer (B).

The above composition of the invention may be supplemented with various agents such as curing accelerators, fillers, plasticizers and additives.

The curing accelerator includes, but is not limited to, organotin compounds, acidic phosphate esters, the reaction product of an acidic phosphate ester and an amine, saturated or unsaturated polycarboxylic acids or anhydrides thereof, and organic titanate compounds.

The organotin compound referred to above includes, but is not limited to, such species as dibutyltin dilaurate, dioctyltin dimaleate, dibutyltin phthalate, stannous octoate and dibutyltin methoxide. The acidic phosphate esters referred to above are disclosed in Japanese Kokai Publication Sho-63-112642. The organic titanate compound includes titanic esters such as tetrabutyl titanate, tetraisopropyl titanate and triethanolamine titanate.

The level of addition of said curing accelerator based on 100 weight parts of the polymer (A) and oxyalkylene polymer (B) combined is preferably 0.1 to 20 weight parts, more preferably 0.5 to 10 weight parts.

The filler mentioned above includes heavy calcium carbonate, light calcium carbonate, calcium carbonate gel, kaolin, talc, silica, titanium dioxide, aluminum silicate, magnesium oxide, zinc oxide, carbon black, and so forth.

The plasticizer includes dioctyl phthalate, butyl benzyl phthalate, chlorinated paraffin, epoxidized soybean oil and so forth.

As additives, an antisagging agent such as hydrogenated castor oil or organic bentonite, a colorant, an antioxidant and so forth can be employed. Moreover, for improved adhesiveness, curability and shelf-life, silicon compounds such as alkylsilanes, aminosilanes and epoxysilanes can be added.

The composition thus obtained can be used with advantage as adhesives or pressure sensitive adhesives, coatings, painted surface waterproof materials, sealants, mold materials, casting rubber materials, foam materials and other uses. Particularly, the composition is suitable for home interior use as architectural adhesives and sealants.

Polymers and polymer compositions obtained by the method of the invention do not contain aromatic compounds and do not have an adverse effect on environment.

EXAMPLES

The following examples illustrate the present invention in further detail without defining the scope of the invention.

Example of Synthesis—1

A solution was prepared by dissolving 2.0 g of the polymerization initiator azobis-2-methylbutyronitrile in a mixture of 28 g of butyl acrylate, 46 g of methyl methacrylate, 20 g of stearyl methacrylate, 4.4 g of γ-methacryloxypropylmethyldimethoxysilane and 23 g of isobutyl alcohol. This solution was added to 43 g of isobutyl alcohol heated at 105° C. dropwise over 4 hours and the polymerization reaction was carried out for 2 hours to give a copolymer with a solids concentration of 60% and a GPC (polystyrene equivalent) number average molecular weight (Mn) of 8,700 (polymer A).

Comparative Example of Synthesis—1

A solution was prepared by dissolving 2.0 g of the polymerization initiator azobis-2-methylbutyronitrile in a mixture of 28 g of butyl acrylate, 46 g of methyl methacrylate, 20 g of stearyl methacrylate, 4.4 g of γ-methacryloxypropylmethyldimethoxysilane and 23 g of toluene. This solution was added to 43 g of toluene heated at 105° C. dropwise over 4 hours and the polymerization reaction was carried out for 2 hours to give a copolymer with a solids concentration of 60% and a GPC (polystyrene equivalent) number average molecular weight (Mn) of 9,100 (polymer B).

Example of Synthesis—2

A solution was prepared by dissolving 2.6 g of the polymerization initiator azobisisobutyronitrile in a mixture of 6.0 g of butyl acrylate, 66 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of isobutyl alcohol. This solution was added to 43 g of isobutyl alcohol heated to 105° C. dropwise over 4 hours and the polymerization reaction was carried out for 2 hours to give a copolymer with a solids concentration of 60% and a GPC (polystyrene equivalent) number average molecular weight (Mn) of 1,900 (polymer C).

Example of Synthesis—3

A solution was prepared by dissolving 2.6 g of the polymerization initiator azobisisobutyronitrile in a mixture of 6.0 g of butyl acrylate, 66 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of n-butyl alcohol. This solution was added to 43 g of n-butyl alcohol heated to 105° C. dropwise over 4 hours and the polymerization reaction was carried out for 2 hours to give a copolymer with a solids concentration of 60% and a GPC (polystyrene equivalent) number average molecular weight (Mn) of 2,000 (polymer D).

Example of Synthesis—4

A solution was prepared by dissolving 2.6 9 of the polymerization initiator azobis-2-methylbutyronitrile in a mixture of 8.0 g of butyl acrylate, 64 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of t-amyl alcohol. This solution was added to 43 g of t-amyl alcohol at 100° C. dropwise over 4 hours and the polymerization reaction was carried out for 2 hours to give a copolymer with a solids concentration of 60% and a GPC (polystyrene equivalent) number average molecular weight (Mn) of 2,000 (polymer E).

Example of Synthesis—5

A solution was prepared by dissolving 2.6 g of the polymerization initiator azobisisobutyronitrile in a mixture of 6.0 g of butyl acrylate, 66 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of butyl acetate. This solution was added to 43 g of butyl acetate at 115° C. dropwise over 4 hours and the polymerization reaction was carried out for 2 hours to give a copolymer with a solids concentration of 60% and a GPC (polystyrene equivalent) number average molecular weight (Mn) of 1,800 (polymer F).

Example of Synthesis—6

A solution was prepared by dissolving 2.6 g of the polymerization initiator azobisisobutyronitrile in a mixture of 6.0 g of butyl acrylate, 66 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of propyl acetate. This solution was added to 43 g of propyl acetate at 100° C. dropwise over 4 hours, and the polymerization reaction was carried out for 2 hours to give a copolymer with a solids concentration of 60% and a GPC (polystyrene equivalent) number average molecular weight (Mn) of 2,100 (polymer G).

Example of Synthesis—7

A solution was prepared by dissolving 2.6 g of the polymerization initiator azobisisobutyronitrile in a mixture of 6.0 g of butyl acrylate, 66 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of methylcyclohexane. This solution was added to 43 g of methylcyclohexane at 100° C. dropwise over 4 hours, and the polymerization reaction was carried out for 2 hours to give copolymer with a solids concentration of 60% and a GPC (polystyrene equivalent) number average molecular weight (Mn) of 2,100 (polymer H).

Example of Synthesis—8

A solution was prepared by dissolving 2.6 g of the polymerization initiator azobisisobutyronitrile in a mixture of 19 g of butyl acrylate, 66 g of methyl methacrylate, 5.4 gof γ-methacryloxypropylmethyldimethoxysilane, 7.0 g of γ-mercaptopropylmethyldimethoxysilane and 23 g of isobutyl alcohol. This solution was added to 43 g of isobutyl alcohol at 105° C. dropwise over 4 hours, and the polymerization reaction was carried out for 2 hours to give a copolymer with a solids concentration of 60% and a GPC (polystyrene equivalent) number average molecular weight (Mn) of 2,100 (polymer I).

Example of Synthesis—9

A solution was prepared by dissolving 1.0 g of the polymerization initiator azobisisobutyronitrile in a mixture of 60 g of glycidyl methacrylate, 30 g of acrylonitrile, 10 g of γ-methacryloxypropyltrimethoxysilane and 40 g of isobutyl alcohol. This solution was added to 60 g of isobutyl alcohol at 105° C. dropwise over 4 hours, and the polymerization reaction was carried out for 2 hours to give a copolymer with a solids concentration of 50% and a GPC (polystyrene equivalent) number average molecular weight (Mn) of 14,600 (polymer J).

Example of Synthesis—10

A solution was prepared by dissolving 0.6 g of the polymerization initiator azobisisobutyronitrile in a mixture of 98 g of butyl acrylate, 2.0 of γ-methacryloxypropylmethyldimethoxysilane and 17 g of isobutyl alcohol. This solution was added to 33 g of isobutyl alcohol at 105° C. dropwise over 4 hours, and the polymerization reaction was carried out for 2 hours to give a copolymer with a solids concentration of 60% and a GPC (polystyrene equivalent) number average molecular weight (Mn) of 11,700 (polymer K).

Example of Synthesis—11

A solution was prepared by dissolving 2.6 g of the polymerization initiator 2,2'-azo(2,4-dimethylvaleronitrile) in a mixture of 6.0 g of butyl acrylate, 66 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of 2-propanol. This solution was added to 43 g of 2-propanol at 80° C. dropwise over 4 hours, and the polymerization reaction was carried out for 2 hours to give a copolymer with a solids concentration of 60% and a GPC (polystyrene equivalent) number average molecular weight (Mn) of 1,900 (polymer L).

Example of Synthesis—12

A solution was prepared by dissolving 2.6 g of the polymerization initiator 2,2'-azo(2,4-dimethylvaleronitrile) in a mixture of 19 g of butyl acrylate, 66 g of methyl methacrylate, 5.4 g of γ-methacryloxypropylmethyldimethoxysilane, 7.0 g of γ-mercaptopropylmethyldimethoxysilane and 23 g of dimethyl carbonate. This solution was added to 43 g of dimethyl carbonate at 90° C. dropwise over 4 hours, and the polymerization reaction was carried out for 2 hours to give a copolymer with a solids concentration of 60% and a GPC (polystyrene equivalent) number average molecular weight (Mn) of 2,100 (polymer M).

Comparative Example of Synthesis—2

A solution was prepared by dissolving 2.6 g of the polymerization initiator azobisisobutyronitrile in a mixture of 6.0 g of butyl acrylate, 66 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of toluene. This solution was added to 43 g of toluene at 105° C. dropwise over 4 hours, and the polymerization reaction was carried out for 2 hours to give a copolymer with a solids concentration of 60% and a GPC (polystyrene equivalent) number average molecular weight (Mn) of 1,800 (polymer N).

Example of Synthesis—13

Using polypropylene glycol and polypropylene triol as initiators and zinc hexacyanocobaltate-glyme complex as a catalyst, propylene oxide was polymerized to give a polyoxypropylene glycol having a number average molecular weight of 13,000 as determined by terminal group analysis. Then, relative to the hydroxyl group of this hydroxyl group-terminated polyoxypropylene glycol, 1.2 equivalents of NaOCH$_3$/methanol solution was added and the methanol was then distilled off. Then, 3-chloro-1-prepene was added for converting the terminal hydroxyl group to an allyl group. To 500 g of the resulting allyl group-terminated oxypropylene polymer thus obtained, 10 g of hexane was added and the water was removed azeotropically at 90° C. The hexane was then distilled off under reduced pressure, and after nitrogen purging, 30 Al of platinum divinyldisiloxane complex (3 weight % (as platinum) solution in xylene) was added. Then, 7.0 g of dimethoxymethylsilane (DMS) was gradually added dropwise under stirring. The mixture solution was reacted at 90° C. for 2 hours, at the end of which time the unreacted DMS was distilled off under reduced pressure to give a reactive silicone functional group-containing polyoxypropylene polymer. It was confirmed by $^1$H-NMR analysis of this polymer that the rate of terminal introduction of the reactive silicone functional group was 75% (polymer 0). The number average molecular weight of the polymer was about 13,000.

Example 1

The copolymer (polymer A) obtained in Example of Synthesis-1 and the oxyalkylene polymer (polymer O) obtained in Example of Synthesis-13 were blended in a solids ratio (weight ratio) of 40/60 and using an evaporator, an evaporation was carried out under reduced pressure at 110° C. to give a composition of the invention with a solids concentration of ≧99%.

Examples 2 to 12

Except that the copolymers (polymers C to M) obtained in Examples of Synthesis 2 to 12 were respectively used as the copolymer, the procedure of Example 1 was otherwise repeated to give compositions of the invention.

Comparative Examples 1 and 2

Except that the copolymers (polymers B and N) obtained in Comparative Examples of Synthesis 1 and 2 were respectively used as the copolymer, the procedure of Example 1 was otherwise repeated to give compositions.

Determination of the residual solvent in each of the above compositions by gas chromatography (detection limit: 50 ppm) gave the results presented in Table 1.

TABLE 1

| | Composition | | Residual solvent (ppm) | | | | | | | Weatherability |
|---|---|---|---|---|---|---|---|---|---|---|
| | Polymer (A) | Oxyalkylene polymer (B) | Aromatic solvent | Butyl alcohol | Propyl alcohol | Other alcohol solvent | Dialkyl carbonate | Other nonaromatic solvent | Workability | SWOM* 3000 Hr |
| Example 1 | Polymer A | Polymer O | N.D | 1,500 | N.D | N.D | N.D | N.D | ○ | ○ |
| Example 2 | Polymer C | | N.D | 1,700 | N.D | N.D | N.D | N.D | ○ | ○ |
| Example 3 | Polymer D | | N.D | 1,800 | N.D | N.D | N.D | N.D | ○ | ○ |
| Example 4 | Polymer E | | N.D | N.D | N.D | 2,100 | N.D | N.D | ○ | ○ |
| Example 5 | Polymer F | | N.D | N.D | N.D | N.D | N.D | 1,600 | ○ | ○ |
| Example 6 | Polymer G | | N.D | N.D | N.D | N.D | N.D | 1,500 | ○ | ○ |
| Example 7 | Polymer H | | N.D | N.D | N.D | N.D | N.D | 1,700 | ○ | ○ |
| Example 8 | Polymer I | | N.D | 1,500 | N.D | N.D | N.D | N.D | ○ | ○ |
| Example 9 | Polymer J | | N.D | 1,800 | N.D | N.D | N.D | N.D | ○ | ○ |
| Example 10 | Polymer K | | N.D | 1,600 | N.D | N.D | N.D | N.D | ○ | ○ |
| Example 11 | Polymer L | | N.D | N.D | 100 | N.D | N.D | N.D | ○ | ○ |
| Example 12 | Polymer M | | N.D | N.D | N.D | N.D | 100 | N.D | ○ | ○ |
| Comparative Example 1 | Polymer B | | 1,800 | N.D | N.D | N.D | N.D | N.D | Δ | x |
| Comparative Example 2 | Polymer N | | 2,000 | N.D | N.D | N.D | N.D | N.D | Δ | x |

Workability
Δ slightly viscotic
○ non viscotic
Weatherability
○ good condition
x crack
*SWOM means Sunshine Weather-O-Meter.

The amounts of emission of organic compound (TVOC) from the compositions according to Examples 11 and 12 and Comparative Example 1 after 10 days were respectively determined by the GEV method (however, at application of the compositions, a tin curing catalyst (Trade name: U220, Product of Nitto Kasei) was added at the level of 2 weight parts based on 100 weight parts of the total polymer).

The data generated by the GEV method on the emission of organic compounds from the compositions according to examples 1 and 2 and comparative example 1 are presented in table 2.

TABLE 2

GEV Emission Data

| Example | Polymer (A) | Polymer (B) | Amount of emission (TVOC) [µg/m³] Aromatic | Amount of emission (TVOC) [µg/m³] Non-aromatic | Substances designated in Ministry of Health, Labour and Welfare Control Target Value Program* |
|---|---|---|---|---|---|
| Example 11 | Polymer L | | N.D | 420 | N.D. |
| Example 12 | Polymer M | Polymer O | N.D | 200 | N.D. |
| Comparative example 1 | Polymer B | | 2,000 | 500 | 50(toluene) |

*Xylene, toluene, ethylbenzene, p-dichlorobenzene, styrene, di-2-ethylhexyl phthalate and di-n-butyl phthalate are assayed at the detection limit of 1 [µg/m³] and formaldehyde is assayed at the detection limit of 5 [µg/m³].

What is claimed is:

1. A polymer composition comprising
a reactive composition (C) comprising a polymer (A) comprising a (meth)acrylic ester monomer unit as a molecular chain and having a silicon-containing functional group capable of crosslinking through formation of a siloxane bond and an oxyalkylene polymer (B) having a silicon-containing functional group capable of crosslinking through formation of a siloxane bond and
a nonaromatic solvent component, with the aromatic solvent content of the polymer composition being not more than 1,000 ppm based on the whole reactive composition (C) and
said polymer (A) being obtained by a method which comprises polymerizing the (meth)acrylic ester monomer using a solvent not containing any aromatic solvents as a polymerization solvent.

2. The composition according to claim 1,
wherein the total emission of organic compounds from said reactive composition (C) into the air is less than 1,500 µg/m³
as measured by the method described in the Feb. 14, 2001 edition of GEV Specification and Classification Criteria established by GEV: Gemeinschaft Emissionskontrollierte Verlegewerkstoffe e.V.

3. The composition according to claim 1,
wherein the total emission of organic compounds from said composition (C) into the air is less than 500 µg/m³
as measured by the method described in the Feb. 14, 2001 edition of GEV Specification and Classification Criteria established by GEV: Gemeinschaft Emissionskontrollierte Verlegewerkstoffe e.V.

4. The composition according to claim 1,
wherein the oxyalkylene polymer as a starting material for the oxyalkylene polymer (B) having a silicon-containing functional group capable of crosslinking through formation of a siloxane bond is an oxyalkylene polymer
produced by at least one method selected from the group consisting of the anionic polymerization method using a caustic alkali, the chain-extending reaction method starting with an oxyalkylene polymer, the polymerization method using a double metal cyanide complex as a catalyst, the polymerization method using cesium metal as a catalyst, and the polymerization method using a polyphosphazene salt as a catalyst.

5. The composition according to claim 1,
wherein the silicon-containing functional group capable of crosslinking through formation of a siloxane bond in each of said polymer (A) and polymer (B) is at least one member selected from the group consisting of dimethylmonomethoxysilyl, methyldimethoxysilyl, trimethoxysilyl, methyldiethoxysilyl, triethoxysilyl, methyldiisopropenyloxysilyl, and triisopropenyloxysilyl group.

6. The composition according to claim 1,
wherein the oxyalkylene polymer
as a starting material for the oxyalkylene polymer (B) having a silicon-containing functional group capable of crosslinking through formation of a siloxane bond is a polymer
produced by the polymerization method using a double metal cyanide complex as a catalyst and
having a number average molecular weight, Mn, of not less than 6,000 and a molecular weight distribution, Mw/Mn, of not more than 1.6.

7. The composition according to claim 1,
wherein the total emission of organic compounds into the air from a cured artifact
obtained by allowing the reactive composition (C) to cure at atmospheric temperature for 10 days and further at 50° C. for 14 days is less than 100 $\mu g/m^3$.

8. The composition according to claim 1,
wherein the reactive composition (C) does not contain any of toluene, xylene, styrene, ethylbenzene, p-dichlorobenzene, di-2-ethylhexyl phthalate, di-n-butyl phthalate, and formaldehyde.

9. The composition according to claim 1,
wherein the reactive composition (C) is such that the total emission of organic compounds therefrom into the air
as measured by the method described in the Feb. 14, 2001 edition of GEV Specification and Classification Criteria established by GEV: Gemeinschaft Emissionskontrollierte Verlegewerkstoffe e.V.
is less than 1 $\mu g/m^3$ for any of toluene, xylene, styrene, ethylbenzene, p-dichlorobenzene, di-2-ethylhexyl phthalate, and di-n-butyl phthalate and less than 5 $\mu g/m^3$ for formaldehyde.

* * * * *